United States Patent
Urano

(10) Patent No.: US 8,651,088 B2
(45) Date of Patent: Feb. 18, 2014

(54) CONTROL APPARATUS FOR INTERNAL COMBUSTION ENGINE

(75) Inventor: Shigeyuki Urano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/576,828

(22) PCT Filed: Nov. 12, 2010

(86) PCT No.: PCT/JP2010/070215
§ 371 (c)(1),
(2), (4) Date: Aug. 2, 2012

(87) PCT Pub. No.: WO2012/063362
PCT Pub. Date: May 18, 2012

(65) Prior Publication Data
US 2013/0213354 A1    Aug. 22, 2013

(51) Int. Cl.
F02M 7/00    (2006.01)
F02P 5/00    (2006.01)

(52) U.S. Cl.
USPC .................... 123/435; 123/406.41

(58) Field of Classification Search
USPC ........... 73/35.12, 114.16, 114.17, 114.18, 73/114.22; 123/90.15, 90.16, 90.17, 345, 123/346, 347, 348, 406.11, 406.12, 406.19, 123/406.2, 406.41, 494
See application file for complete search history.

(56) References Cited

U.S. PATENT DOCUMENTS

| | | | |
|---|---|---|---|
| 7,693,646 B2 * | 4/2010 | Moriya | 701/111 |
| 7,861,690 B2 * | 1/2011 | Moriya et al. | 123/406.41 |
| 2007/0113827 A1 * | 5/2007 | Moriya et al. | 123/435 |
| 2008/0201056 A1 * | 8/2008 | Moriya | 701/103 |
| 2008/0319633 A1 * | 12/2008 | Moriya et al. | 701/103 |
| 2009/0314264 A1 | 12/2009 | Takahashi et al. | |

FOREIGN PATENT DOCUMENTS

| | | |
|---|---|---|
| JP | A-2005-351146 | 12/2005 |
| JP | A-2006-132526 | 5/2006 |
| JP | A-2007-146785 | 6/2007 |
| JP | A-2008-25404 | 2/2008 |
| JP | A-2008-25551 | 2/2008 |
| JP | A-2010-190090 | 9/2010 |

OTHER PUBLICATIONS

International Search Report issued in International Patent Application No. PCT/JP2010/070215 dated Dec. 14, 2010 (with translation).

* cited by examiner

Primary Examiner — Stephen K Cronin
Assistant Examiner — Sizo Vilakazi
(74) Attorney, Agent, or Firm — Oliff PLC

(57) ABSTRACT

In an internal combustion engine having an in-cylinder pressure sensor provided on each cylinder, an in-cylinder pressure detection value is corrected into an absolute pressure using an absolute pressure correction value Pr by calculating the absolute pressure correction value Pr $(=(P_2 V_2^\kappa - P_1 V_1^\kappa)/(V_1^\kappa - V_2^\kappa))$ from in-cylinder pressure detection values $P_1$ and $P_2$, in-cylinder volumes $V_1$ and $V_2$, and a specific heat ratio K at predetermined crank angles $\theta_1$ and $\theta_2$ during the adiabatic compression stroke from IVC to the ignition timing. When the adiabatic compression stroke (ignition timing–IVC) is shorter than a predetermined crank angle period $CA_{th}$, the ignition timing is delayed. When the adiabatic compression stroke is longer than or equal to $CA_{th}$, IVC is advanced. Preferably, a torque variation is suppressed by controlling the ignition timing of each cylinder before IVC is advanced.

6 Claims, 6 Drawing Sheets

CONTROL APPARATUS FOR INTERNAL COMBUSTION ENGINE

TECHNICAL FIELD

The present invention relates to a control apparatus for an internal combustion engine. More specifically, the present invention relates to a control apparatus for an internal combustion engine on which an in-cylinder pressure sensor is mounted.

BACKGROUND ART

Previously, for example, Japanese Patent Laid-Open No. 2007-146785 has disclosed a control apparatus which calculates an amount of air sucked into a combustion chamber using a value detected by an in-cylinder pressure sensor (hereinafter referred to as "CPS") and determines optimal ignition timing using the calculated amount of air. The CPS detects an in-cylinder pressure as a relative pressure with reference to an intake pipe pressure. Thus, a value detected by the CPS needs to be corrected to its absolute pressure in order to be used for various controls. Using the fact that $PV^\kappa$ ($\kappa$ is a specific heat ratio) is theoretically constant during a compression stroke after an intake bottom dead center, the above-described conventional control apparatus calculates an error (absolute pressure correction value Pr) of the absolute pressure of the value detected by the CPS by the following equation (1) using Poisson's equation established during the compression stroke. Incidentally, in the following equation (1), $Pc(\theta_a)$ and $Pc(\theta_b)$ are values detected by the CPS at two predetermined crank angles $\theta_a$ and $\theta_b$ during the compression stroke, and $V(\theta_a)$ and $V(\theta_b)$ are in-cylinder (combustion chamber) volumes when $Pc(\theta_a)$ and $Pc(\theta_b)$ are detected.

$$\text{Absolute pressure correction value } Pr=(Pc(\theta_b)\cdot V^\kappa(\theta_b)-Pc(\theta_a)\cdot V^\kappa(\theta_a))/(V^\kappa(\theta_a)-V^\kappa(\theta_b)) \quad (1)$$

PRIOR ART DOCUMENTS

Patent Documents

Patent Document 1: JP-A-2007-146785

SUMMARY OF THE INVENTION

Problem to be Solved by the Invention

In accordance with the above equation (1), the absolute pressure correction value is calculated using two values detected by the CPS during an adiabatic compression stroke. Accordingly, for example, when the closing timing of an intake valve (IVC) is late, two values $Pc(\theta_a)$ and $Pc(\theta_b)$ are detected by the CPS during a short adiabatic compression stroke. Thus, a difference between the in-cylinder volumes $(V^\kappa(\theta_a)-V^\kappa(\theta_b))$ may become extremely small. At this time, the denominator of the above equation (1) will be near zero, and therefore the absolute pressure correction value will be largely varied. Under such an operation condition that an adiabatic compression stroke of an internal combustion engine is short, an absolute pressure correction value may not be calculated accurately. Thus, further improvements have been desired.

The present invention has been made to solve the above-described problem. An object of the present invention is to provide a control apparatus for an internal combustion engine for correcting a value detected by a CPS into an absolute pressure with high accuracy irrespective of the length of an adiabatic compression stroke of the internal combustion engine.

Means for Solving the Problem

In accomplishing the above object, according to a first aspect of the present invention, there is provided a control apparatus for an internal combustion engine comprising:
an in-cylinder pressure sensor for outputting an in-cylinder pressure detection value of a predetermined cylinder at a predetermined crank angle in the internal combustion engine;
in-cylinder pressure detecting means for detecting in-cylinder pressure detection values P1 and P2 at predetermined crank angles $\theta_1$ and $\theta_2$ during an adiabatic period of the predetermined cylinder from IVC to ignition timing using the in-cylinder pressure sensor;
absolute pressure correction value calculating means that, when an in-cylinder volume of the predetermined cylinder at the crank angle $\theta_1$ is $V_1$, an in-cylinder volume of the predetermined cylinder at the crank angle $\theta_2$ is $V_2$, and a specific heat ratio of in-cylinder gas in the predetermined cylinder is $\kappa$, calculates a value obtained by dividing a value obtained by subtracting $P_1V_1^\kappa$, which is $PV^\kappa$ at the crank angle $\theta_1$, from $P_2V_2^\kappa$, which is $PV^\kappa$ at the crank angle $\theta_2$, by a value $(V_1^\kappa-V_2^\kappa)$ as an absolute pressure correction value; and
absolute pressure correcting means for correcting the in-cylinder pressure detection value by using the absolute pressure correction value; the apparatus comprising:
comparing means for comparing the adiabatic period with a predetermined period; and
adiabatic period changing means for extending the adiabatic period when the adiabatic period is shorter than the predetermined period.

According to a second aspect of the present invention, there is provided the control apparatus as described in the first aspect, further comprising:
torque variation calculating means for calculating a torque variation of the internal combustion engine, wherein
the adiabatic period changing means includes ignition delaying means for delaying the ignition timing when the adiabatic period is shorter than the predetermined period and when the torque variation is smaller than a predetermined value.

According to a third aspect of the present invention, there is provided the control apparatus as described in the second aspect, wherein the ignition delaying means includes delay angle amount setting means for setting a delay angle amount at the ignition timing in a range where the torque variation does not exceed the predetermined value.

According to a fourth aspect of the present invention, there is provided the control apparatus as described in any one of the first to third aspects, comprising:
torque variation calculating means for calculating the torque variation of the internal combustion engine; and
a variable valve timing mechanism for varying the timing of the IVC, wherein
the adiabatic period changing means includes IVC advancing means for advancing the IVC by controlling the variable valve timing mechanism when the adiabatic period is shorter than the predetermined period and when the torque variation is larger than or equal to a predetermined value.

According to a fifth aspect of the present invention, there is provided the control apparatus as described in any one of the second to fourth aspects, further comprising:
torque variation balance controlling means that executes torque variation balance control for suppressing the torque variation by controlling the ignition timing of each cylinder in the internal combustion engine when the adiabatic period is shorter than the predetermined period and when the torque variation is larger than or equal to a predetermined value.

Effects of the Invention

According to the first aspect of the invention, in the control apparatus for the internal combustion engine for correcting the in-cylinder pressure detection value detected by the in-cylinder pressures sensor (CPS) using the absolute pressure correction value, the adiabatic period from the closing timing of the intake valve (IVC) of the predetermined cylinder to the ignition timing is compared with the predetermined period. When the adiabatic period is shorter than the predetermined period, the adiabatic period is extended. Thus, the calculation accuracy of the absolute pressure correction value is improved, and therefore the in-cylinder pressure detection value can be corrected with high accuracy.

According to the second aspect of the invention, the ignition timing is delayed when the adiabatic period is shorter than the predetermined period and when the torque variation of the internal combustion engine is smaller than the predetermined value. Thus, the adiabatic period can be effectively extended without largely impairing the drivability.

According to the third aspect of the invention, the delay angle amount of the ignition timing is set in the range where the torque variation does not exceed the predetermined value. Thus, according to this aspect of the invention, the correction accuracy of the in-cylinder pressure can be improved while the deterioration of the drivability can be suppressed.

According to the fourth aspect of the invention, IVC is advanced when the adiabatic period is shorter than the predetermined period and when the torque variation of the internal combustion engine is larger than or equal to the predetermined value. Thus, the adiabatic period can be effectively extended while suppressing the torque variation in the area where the drivability may be largely impaired when the ignition timing is delayed.

According to the fifth aspect of the invention, the torque variation is suppressed by controlling the ignition timing of each cylinder in the internal combustion engine when the adiabatic period is shorter than the predetermined period and when the torque variation of the internal combustion engine is larger than or equal to the predetermined value. Thus, by suppressing the torque variation before the adiabatic period is extended, the deterioration of the drivability can be effectively suppressed.

MODE FOR CARRYING OUT THE INVENTION

Figure 1:
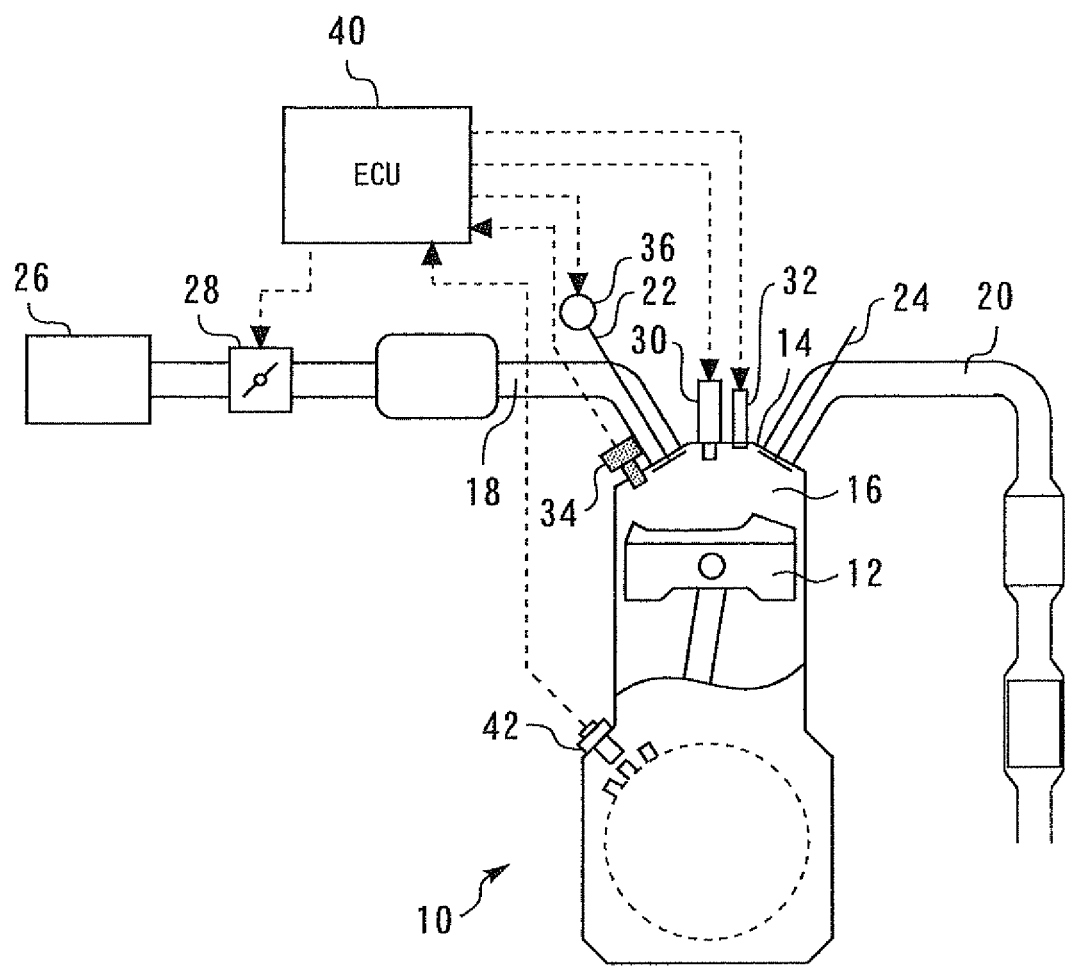
FIG. 1 is a schematic block diagram for explaining a system structure according to a first embodiment of the present invention.

An embodiment of the present invention will be explained below with reference to the accompanying drawings. The same or corresponding elements in the drawings are denoted by the same reference numerals, and the duplicated explanation thereof is omitted. The present invention is not limited to the embodiment as described below.

First Embodiment

Structure of First Embodiment

FIG. 1 is a schematic block diagram for explaining a system structure according to a first embodiment of the present invention. As shown in FIG. 1, a system according to the first embodiment includes an internal combustion engine 10. The internal combustion engine 10 is provided by a spark-ignited multi-cylinder engine fueled by gasoline. A piston 12 is reciprocated in the cylinder of the internal combustion engine 10. The internal combustion engine 10 includes a cylinder head 14. A combustion chamber 16 is formed between the piston 12 and the cylinder head 14. One end of an intake passage 18 and one end of an exhaust passage 20 are communicated with the combustion chamber 16. An intake valve 22 and an exhaust valve 24 are disposed on a communicated part of the intake passage 18 and the combustion chamber 16 and a communicated part of the exhaust passage 20 and the combustion chamber 16, respectively.

The intake valve 22 includes an intake valve timing controller 36 for variably controlling valve timing. In this embodiment, a variable valve timing mechanism (VVT), which advances or retards the opening and closing timing while maintaining a working angle to be constant by changing a phase angle of a cam shaft (not shown) relative to a crank shaft, is used as the intake valve timing controller 36. Hereinafter, the intake valve timing controller 36 will be referred to as "VVT 36".

An air cleaner 26 is attached to an inlet of the intake passage 18. A throttle valve 28 is disposed downstream of the air cleaner 26. The throttle valve 28 is an electronically controlled valve driven by a throttle motor based on an accelerator opening degree.

An ignition plug 30 is mounted on the cylinder head 14 so as to protrude from an apex of the combustion chamber 16 thereinto. The cylinder head 14 also includes a fuel injection valve 32 for injecting fuel into the cylinder. Further, an in-cylinder pressure sensor (CPS) 34 for detecting an in-cylinder pressure in each cylinder is incorporated into the cylinder head 14.

The system according to this embodiment includes an ECU (Electronic Control Unit) 40 as shown in FIG. 1. The above-described in-cylinder pressure sensor 34 and other various sensors such as a crank angle sensor 42 for detecting a rotational position of the crank shaft are connected to an input unit of the ECU 40. Also, various actuators such as the above-described throttle valve 28, the ignition plug 30, and the fuel injection valve 32 are connected to an output unit of the ECU 40. The ECU 40 controls an operation condition of the internal combustion engine 10 based on various inputted information.

Operation of First Embodiment (Basic Operation for Absolute Pressure Correction)

The CPS 34 is a remarkably effective sensor because the CPS 34 can directly detect a combustion state in the cylinder. Thus, an output of the CPS 34 is used as a control parameter for various controls of the internal combustion engine 10. For example, a detected in-cylinder pressure is used for calculating an amount of intake air sucked into the cylinder or calculating variations of a shown torque. In addition, an amount of heat generation $PV^\kappa$ and MFB (mass fraction of burned fuel) are calculated using the detected in-cylinder pressure. These are used for detecting accidental fire, controlling optimal ignition timing, or the like.

However, the CPS 34 detects the in-cylinder pressure as a relative pressure with reference to an intake pipe pressure. Thus, a value detected by the CPS 34 needs to be corrected to an absolute pressure in order to be used for various controls. The basic operation for absolute pressure correction will be explained below with reference to FIG. 2.

Figure 2:
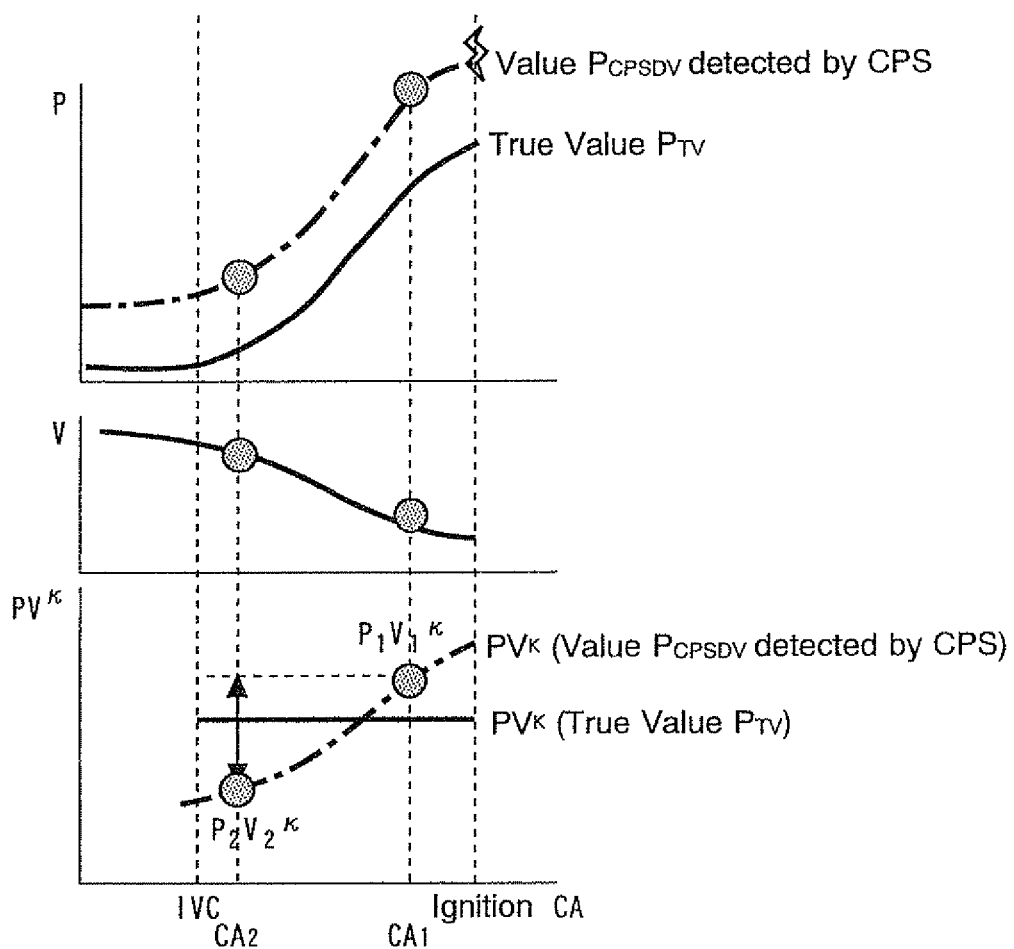
FIG. 2 is an illustration showing the change of the in-cylinder pressure P, the in-cylinder volume V, and $PV^\kappa$ during the compression stroke of the internal combustion engine.

FIG. 2 shows the change of the in-cylinder pressure P, the in-cylinder (combustion chamber 16) volume V, and $PV^\kappa$ (K is a specific heat ratio) during the compression stroke of the internal combustion engine 10. Incidentally, FIG. 2 is illustrated on the condition that the intake valve 22 is closed after an intake bottom dead center.

As shown in FIG. 2, the in-cylinder pressure P is increased with the ascent of the piston 12 and the in-cylinder volume V is decreased with the ascent of the piston 12 after IVC. The CPS 34 detects the relative pressure with reference to the intake pipe pressure during this process. Thus, the value $P_{CPSDV}$ detected by the CPS shown by a dashed line in FIG. 2 is different from a true value $P_{TV}$ (solid line) of the in-cylinder pressure shown by a solid line in FIG. 2 by an error Pr.

The relationship shown by the following equation (2) is established between the true value $P_{TV}$ and the detected value $P_{CPSDV}$. Then, the ECU 40 executes the absolute pressure correction to exclude the error Pr corresponding to such a difference from the detected value $P_{CPSDV}$. Specifically, using the fact that $PV^\kappa$ during the adiabatic compression stroke from IVC to the ignition timing is theoretically constant and using the relationship shown by the following equation (2), the error Pr is calculated as an absolute pressure correction value Pr by the equation (3) using Poisson's equation established during the adiabatic compression stroke. Incidentally, in the following equation (3), $P_1$ and $P_2$ are values detected by the CPS at two predetermined crank angles during the compression stroke, and $V_1$ and $V_2$ are in-cylinder volumes when $P_1$ and $P_2$ are detected.

$$P_{TV} = P_{CPSDV} + Pr \quad (2)$$

$$Pr = (P_2 V_2^\kappa - P_1 V_1^\kappa)/(V_1^\kappa - V_2^\kappa) \quad (3)$$

By using the above equations (2) and (3), the detected value $P_{CPSDV}$ can be corrected to the absolute pressure without a configuration that detects the intake pipe pressure. When the number of cylinders in the internal combustion engine 10 is n (n is an integer of 2 or more hereinbelow), an adiabatic compression stroke of one cylinder to be corrected into its absolute pressure is almost the same as an adiabatic compression stroke of another cylinder preceding the one cylinder by 1/n cycle (720°/n). Thus, when the detected value $P_{CPSDV}$ of the other cylinder preceding the one cylinder to be corrected by 1/n cycle is used as $P_1$ and $P_2$ in the equation (3), the absolute pressure correction value Pr of the cylinder to be corrected into the absolute pressure can be accurately assumed.

Also, when the crank angles at the time of detecting $P_1$ and $P_2$ are denoted by $CA_1$ and $CA_2$ ($CA_2 < CA_1$), respectively, it is preferred that $CA_1$ be set on the advance angle side as close to the ignition timing of the cylinder to be corrected as possible and $CA_2$ is set on the delay angle side as close to IVC as possible. Accordingly, the interval between the $CA_1$ and $CA_2$ can be extended to the maximum. Thus, the calculation accuracy of the absolute pressure correction value Pr can be improved.

Characteristic Operation of First Embodiment

Next, a characteristic operation of the first embodiment will be explained with reference to FIGS. 3 to 7. An Atkinson cycle is suggested as a system for improving fuel consumption of the internal combustion engine 10. The Atkinson cycle is a system for effectively using thermal energy by increasing an expansion ratio to be larger than a compression ratio and reducing pump loss. When such a system is applied to the system according to this embodiment, IVC may be changed by the VVT 36 to the delay angle side of the intake bottom dead center.

An actual compression ratio can be reduced by changing IVC to the delay angle side of the intake bottom dead center. However, when the actual compression ratio is reduced, a knocking limit at an optimum ignition timing (MBT) is offset to the delay angle side. Then, the period between IVC and the ignition timing, i.e., the adiabatic compression stroke, is shortened. Consequently, the interval between the crank angles $CA_1$ and $CA_2$ for detecting the in-cylinder pressures $P_1$ and $P_2$ will be narrowed.

Figure 3:
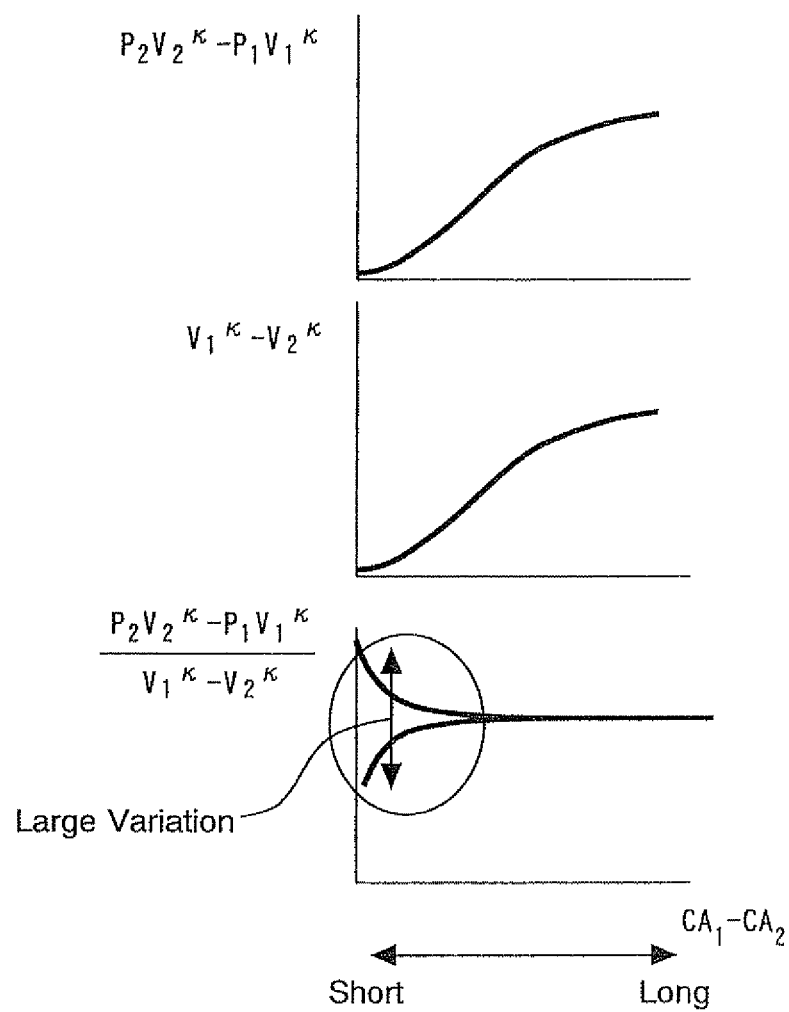
FIG. 3 is an illustration showing a relationship between the interval between the crank angles $CA_1$ and $CA_2$ and the right side of the above equation (3).

FIG. 3 shows a relationship between the interval between the crank angles $CA_1$ and $CA_2$ and the right side of the above equation (3). As shown in FIG. 3, when the detected interval $(CA_1 - CA_2)$ is sufficiently long, both values $(P_2 V_2^\kappa - P_1 V_1^\kappa)$ and $(V_1^\kappa - V_2^\kappa)$ are large. Accordingly, the variation in the calculated absolute pressure correction error Pr is small. However, when the interval $(CA_1 - CA_2)$ is short, the both values $(P_2 V_2^\kappa - P_1 V_1^\kappa)$ and $(V_1^\kappa - V_2^\kappa)$ are small. Accordingly, the variation in the calculated absolute pressure correction error Pr becomes gradually large.

Figure 4:
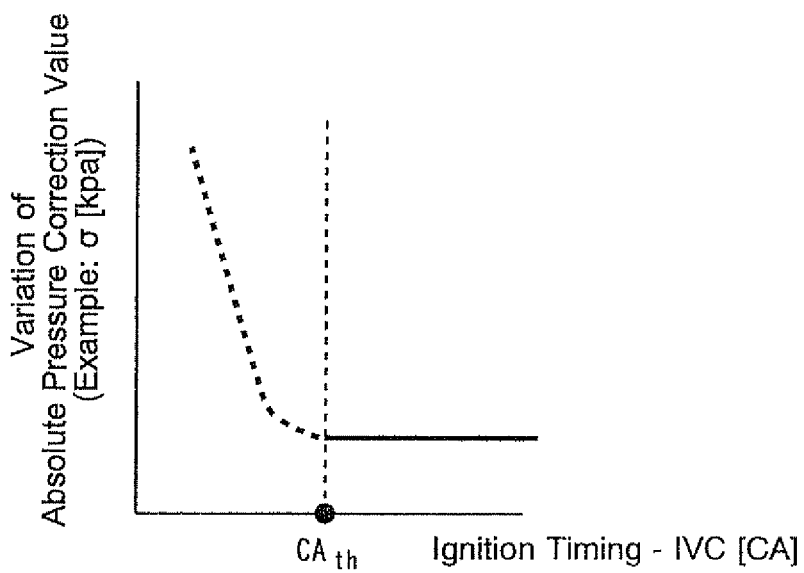
FIG. 4 is an illustration showing the variation of the absolute pressure correction value Pr relative to the adiabatic compression stroke (ignition timing–IVC).

In the system according to this embodiment, thus, when an adiabatic compression stroke between IVC and the ignition timing is shorter than a predetermined crank angle period $CA_{th}$, the system according to the first embodiment executes the control for extending the adiabatic compression stroke and executes the absolute pressure correction based on a value detected by the CPS at this time. FIG. 4 shows the variation of the absolute pressure correction value Pr relative to the adiabatic compression stroke (ignition timing−IVC). As shown in FIG. 4, the variation of the absolute pressure correction value Pr becomes suddenly large as the adiabatic compression stroke is shorter. Thus, it is preferred that the predetermined crank angle period $CA_{th}$ be set to be the minimum crank angle period just before the variation of the absolute pressure correction value Pr becomes large suddenly. Specifically, for example, by comparing the variation of the absolute pressure correction value Pr or its change amount with a predetermined determination value, a crank angle at which the variation of the absolute pressure correction value Pr is suddenly changed can be effectively identified.

The control for extending the adiabatic compression stroke may be ignition delay control for delaying the ignition timing or IVC advance control for advancing IVC. Each control will be explained below in detail.

(Ignition Delay Control)

Figure 5:
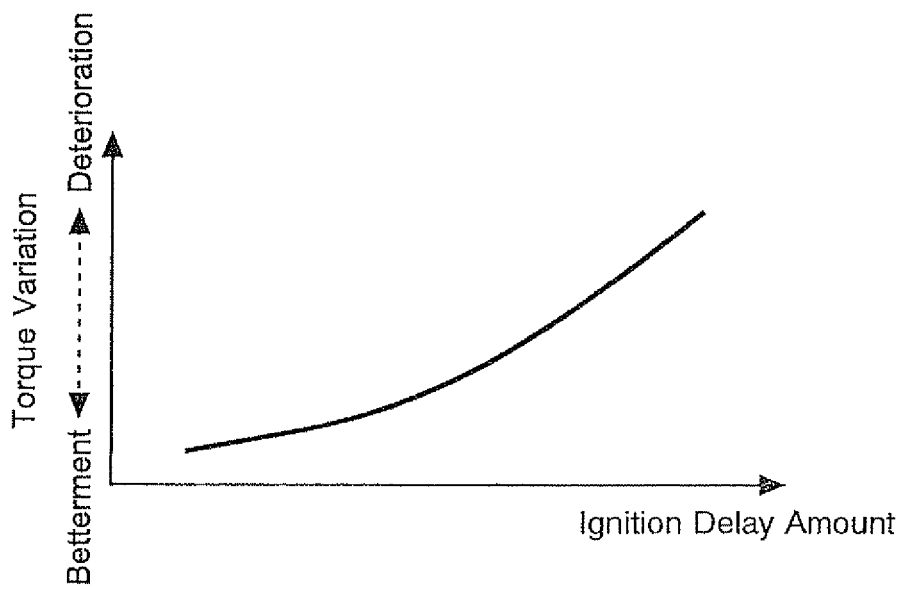
FIG. 5 is an illustration showing a relationship of a torque variation relative to an ignition delay amount.

Firstly, the ignition delay control will be explained below. The ignition delay control can effectively extend the adiabatic compression stroke. However, when related control is executed, the ignition timing is different from the optimal ignition timing (MBT). FIG. 5 illustrates a relationship of a torque variation relative to an ignition delay amount. As shown in FIG. 5, the torque variation is deteriorated as the ignition delay amount becomes larger. Accordingly, it is assumed that the drivability requirement may not be satisfied when the above-described ignition delay control is executed on the operation condition that the torque variation is large.

Thus, the system according to the first embodiment executes the ignition delay control when a torque variation TF of the internal combustion engine 10 is smaller than a predetermined torque variation $TF_{th}$ set in advance as a torque variation which can satisfy the drivability requirement. The torque variation can be calculated by the following formula (4) based on the in-cylinder pressure sensor 34 disposed on each cylinder. In the following formula (4), BPF indicates a bandpass filter processing function (here, the bandpass filter processing is in the range of 1 to 4 Hz) and STD indicates a standard deviation calculating function.

[Formula 1]

$$STD\left(BPF_{1\sim4Hz}\left(\sum_{\theta=-360°}^{+360°} P \times \Delta V\right)\right) \quad (4)$$

Figure 6:
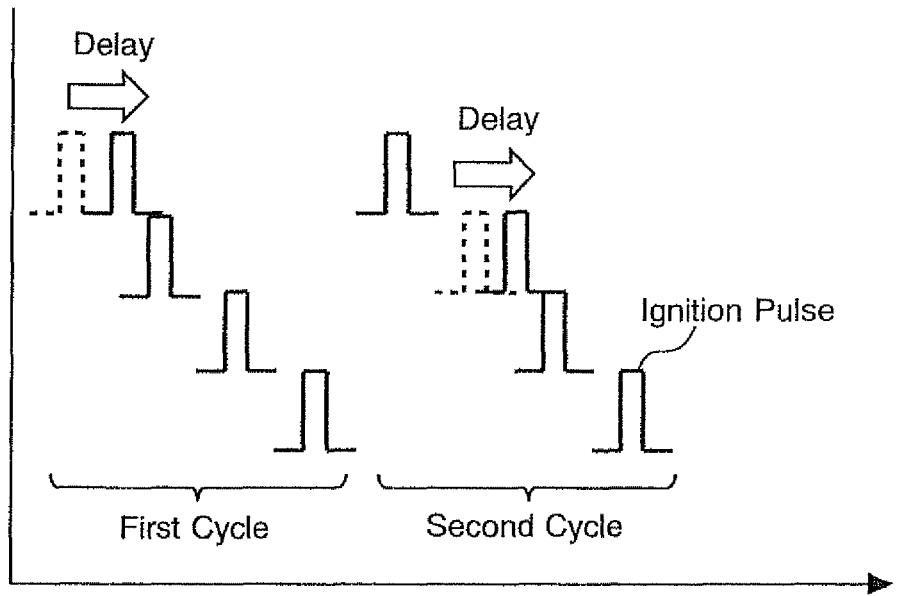
FIG. 6 is a diagram for explaining one example when the ignition timing of one cylinder is delayed per one cycle.

The above-described ignition delay control is executed for every cylinder. FIG. 6 is a diagram for explaining one example when the ignition timing of one cylinder is delayed per one cycle. Since the ignition timing of one cylinder is delayed per one cycle in the example shown in FIG. 6, the absolute pressure correction value Pr of each cylinder is updated once per four cycles. Similarly, when the ignition timings of two cylinders is delayed per one cycle, the absolute pressure correction value Pr of each cylinder is updated once per two cycles.

Figure 7:
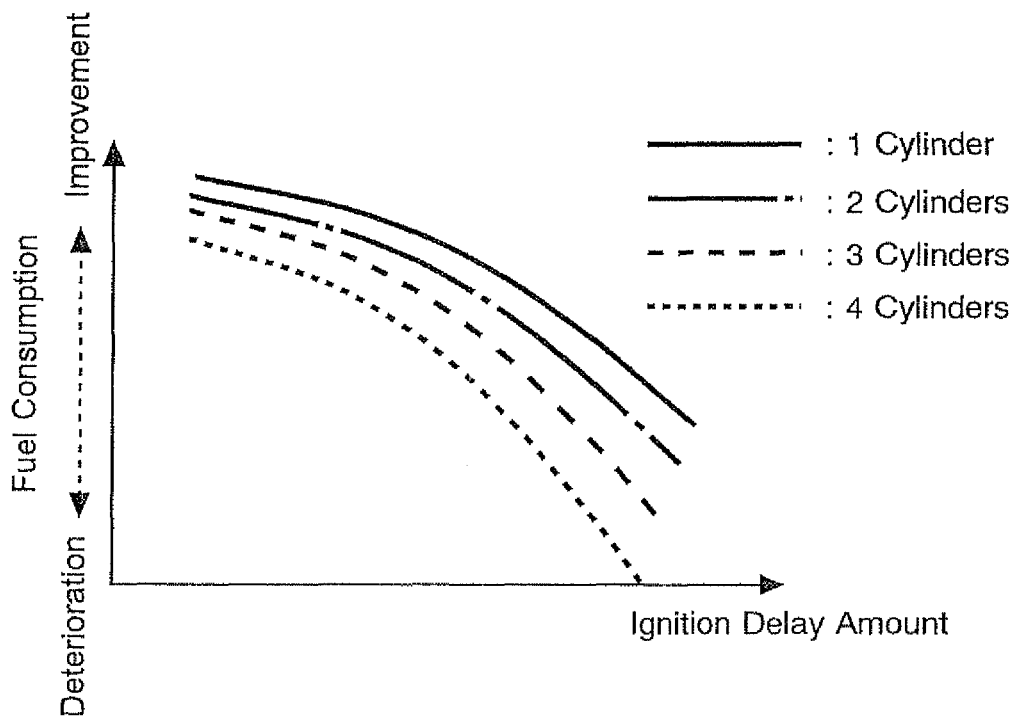
FIG. 7 is an illustration showing a relationship of a deterioration degree of fuel consumption relative to an ignition delay amount for every ignition delay cylinder number.

It is preferred that the number of cylinders of which the ignition timings are delayed per one cycle (hereinafter referred to as "ignition delay cylinder number") be increased in order to increase the update frequency of the absolute pressure correction value Pr. However, the ignition delay control is related to the deterioration of fuel consumption. FIG. 7 illustrates a relationship of a deterioration degree of fuel consumption relative to an ignition delay amount for every ignition delay cylinder number. As shown in FIG. 7, it is proven that the fuel consumption is deteriorated as the ignition delay amount becomes larger and the ignition delay cylinder number becomes larger.

Therefore, in the system according to the first embodiment, the ignition timing cylinder number should be set for every operation area in view of the deterioration degree of fuel consumption when the ignition delay control is executed. Specifically, for example, it is preferred that the ignition delay cylinder number be increased in an operation area (for example, an MBT area) where the deterioration degree of fuel consumption due to the delay of the ignition timing is small, and that the ignition delay cylinder number be decreased in an operation area where the deterioration degree of fuel consumption is large. Thus, the update frequency of the absolute pressure correction value Pr can be improved while suppressing the deterioration of fuel consumption.

(IVC Advance Control)

Next, the IVC advance control will be explained below. As described above, the ignition delay control is not suitable under the operation condition where the torque variation TF is large. Accordingly, it is preferred that the IVC advance control be executed when the torque variation TF is larger than the predetermined torque variation $TF_{th}$. Thus, the adiabatic compression stroke can be effectively extended while the torque variation can be suppressed. However, since the IVC advance control is executed by driving the VVT 36, its control response is deteriorated as compared with the ignition timing control. Also, since the pump loss is increased when IVC is advanced, the fuel consumption is deteriorated.

Therefore, when the torque variation TF is larger than the predetermined torque variation $TF_{th}$, it is preferred that the control for suppressing the torque variation by controlling the ignition timing of each cylinder (hereinafter referred to as "torque variation balance control") be executed before the IVC advance control is executed. When the torque variation TF can be suppressed to be smaller than the predetermined torque variation $TF_{th}$ by executing such control, the ignition delay control is executed instead of the IVC advance control. Thus, the accuracy of the absolute pressure correction can be enhanced while suppressing the deterioration of fuel consumption.

Specific Processing of First Embodiment

Figure 8:
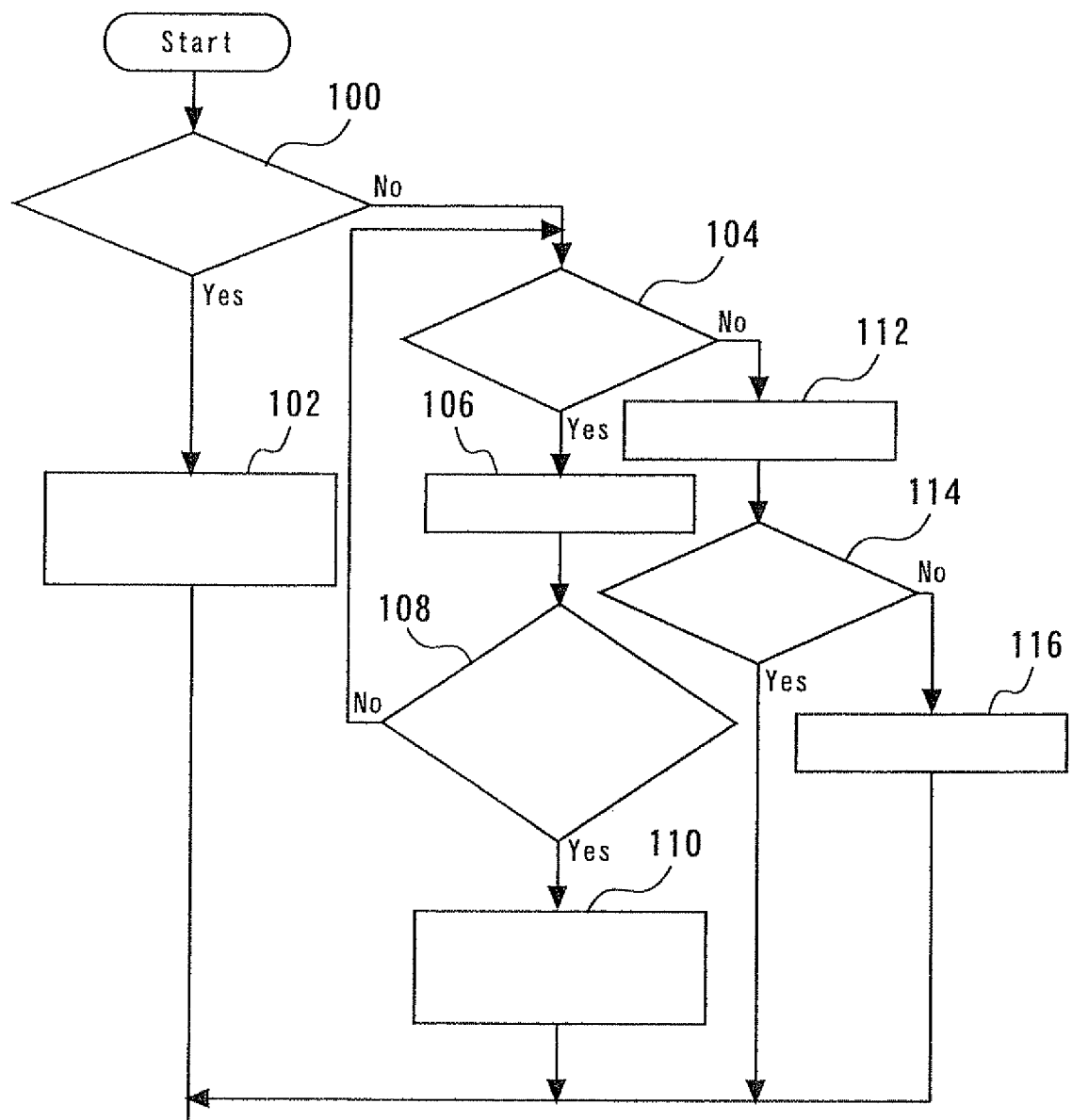
FIG. 8 is a flow chart showing a routine that is executed in accordance with a first embodiment of the present invention.

Next, a specific processing of the first embodiment will be explained with reference to FIG. 8. FIG. 8 is a flow chart showing a routine which the ECU 40 executes in the first embodiment. In the routine shown in FIG. 8, it is firstly determined whether or not a difference in crank angles between the current ignition timing and IVC (adiabatic compression stroke) is larger than the predetermined crank angle period $CA_{th}$ (step 100). A value which is preset in accordance with the relationship shown in FIG. 4 is used as the predetermined crank angle period $CA_{th}$. When the relationship: the ignition timing–IVC>$CA_{th}$ is satisfied, it is determined that the variation of the absolute pressure correction is small. Then, the processing proceeds to a next step to execute the absolute pressure correction for each cylinder based on the above equations (2) and (3) (step 102).

On the other hand, when the relationship: the ignition timing–IVC>$CA_{th}$ is not satisfied in the step 100 described above, it is determined that the variation of the absolute pressure correction is large. Then, the processing proceeds to a next step to determine whether or not the torque variation TF is smaller than the predetermined torque variation $TF_{th}$ (step 104). Specifically, the torque variation TF calculated by using the above equation (4) and the predetermined torque variation $TF_{th}$ are compared with each other. Incidentally, a value which is preset as a torque variation for satisfying the drivability requirement is used as the predetermined torque variation $TF_{th}$. As a result, when the relationship: the torque variation TF<$TF_{th}$ is satisfied, it is determined that the current torque variation is within an allowable range where the drivability requirement is satisfied. Then, the processing proceeds to a next step to sequentially execute the delay control of the ignition timing of each cylinder (step 106). Specifically, the ignition delay amount is set such that the torque variation is within the range where the torque variation does not exceed $TF_{th}$ in view of the relationship between the ignition delay amount and the torque variation shown in FIG. 6. Also, the ignition delay cylinder number is set to be allowable in the set ignition delay amount in view of the relationship between the ignition delay cylinder number and the fuel consumption shown in FIG. 7.

After the ignition delay control is executed in the step 106 described above, it is determined whether or not the adiabatic compression stroke of the cylinder for which the ignition delay control is executed is longer than the predetermined crank angle period $CA_{th}$ (step 108). Specifically, the same processing as the processing in the step 100 described above is executed for the cylinder of which the ignition timing is delayed. When the relationship: the ignition timing–IVC>$CA_{th}$ is not satisfied, it is determined that the variation of the absolute pressure correction is still large. Then, this routine is started again from the step 104 described above.

On the other hand, when the relationship: the ignition timing–IVC>$CA_{th}$ is satisfied in the step 108 described above, it is determined that the variation of the absolute pressure correction is small. Then, the processing proceeds to a next step to execute the absolute pressure correction for the cylinder of which the ignition timing is delayed (step 110).

Further, when the relationship: the torque variation TF<$TF_{th}$ is not satisfied in the step 104 described above, it is determined that the drivability requirement is not satisfied. Then, the processing proceeds to a next step to execute the torque variation balance control (step 112). Specifically, the ignition timing of each cylinder is controlled such that the torque variation is optimum.

Next, it is determined whether or not the torque variation TF is smaller than the predetermined torque variation $TF_{th}$ (step 114). Specifically, the same processing as the processing in the step 104 described above is executed. When the relationship: the torque variation TF<$TF_{th}$ is satisfied, it is determined that the drivability requirement is satisfied due to the processing in the step 112 described above. Then, this routine is terminated immediately. On the other hand, when the relationship: the torque variation TF<$TF_{th}$ is not satisfied in the step 114 described above, it is determined that the drivability requirement is not satisfied yet even after the processing in the step 112 described above. Then, the processing proceeds to a next step to execute the IVC advance control for advancing IVC (step 116).

As described above, the system according to the first embodiment executes the ignition delay control or the IVC advance control when the adiabatic compression stroke is shorter than the predetermined crank angle period $CA_{th}$. Accordingly, the adiabatic compression stroke can be extended effectively. Thus, the highly accurate absolute pressure correction can be performed while the calculation variation of the absolute pressure correction value Pr is suppressed.

Especially, the system according to the first embodiment executes the ignition delay control when the adiabatic compression stroke is shorter than the predetermined crank angle period $CA_{th}$ and when the torque variation TF is smaller than the predetermined torque variation $TF_{th}$. Thus, the accuracy of the absolute pressure correction can be improved while the drivability requirement is satisfied.

In addition, the system according to the first embodiment executes the IVC advance control when the adiabatic compression stroke is shorter than the predetermined crank angle period $CA_{th}$ and when the torque variation TF is larger than or equal to the predetermined torque variation $TF_{th}$. Thus, the accuracy of the absolute pressure correction can be improved while the torque variation is suppressed.

Further, the system according to the first embodiment executes the torque variation balance control prior to the IVC advance control when the adiabatic compression stroke is shorter than the predetermined crank angle period $CA_{th}$ and when the torque variation TF is larger than or equal to the predetermined torque variation $TF_{th}$. Thus, the torque variation can be immediately suppressed by the ignition timing control having good control responsiveness and the opportunity for executing the ignition delay control can be effectively enhanced.

In the above-described first embodiment, the VVT which advances or retards the opening and closing timing while maintaining a working angle to be constant by changing a phase angle of a cam shaft relative to a crank shaft is used as the intake valve timing controller 36. However, a device which can be used as the intake valve timing controller 36 is not limited thereto. In other words, for example, IVC for every cylinder may be individually controlled by using a solenoid valve or the like that can vary the closing timing of the intake valve 22 of each cylinder.

In the above-described first embodiment, the value detected by the CPS corresponds to the "in-cylinder pressure detection value" according to the first aspect of the invention, the CPS 34 corresponds to the "in-cylinder pressures sensor" according to the first aspect of the invention, the adiabatic compression stroke corresponds to the "adiabatic period" according to the first aspect of the invention, and the predetermined crank angle period $CA_{th}$ corresponds to the "predetermined period" according to the first aspect of the invention. Also, the ECU 40 executes the processing in the step 100 described above by the "comparing means" according to the first aspect of the invention, the ECU 40 executes the processing in the steps 102 and 108 described above by the "absolute pressure correcting means" according to the first aspect of the invention, and the ECU 40 executes the processing in the steps 106 and 116 described above by the "adiabatic period changing means" according to the first aspect of the invention.

Further, in the above-described first embodiment, the predetermined torque variation $TF_{th}$ corresponds to the "predetermined value" according to the second aspect of the invention. The ECU 40 execute the processing in the step 104 described above by the "torque variation calculating means" according to the second aspect of the invention, and the ECU 40 executes the processing in the step 106 described above by the "ignition delaying means" according to the second aspect of the invention.

Further, in the above-described first embodiment, the ECU 40 executes the processing in the step 106 described above by the "delay angle amount setting means" according to the third aspect of the invention.

In addition, in the above-described first embodiment, the predetermined torque variation $TF_{th}$ corresponds to the "predetermined value" according to the fourth aspect of the invention, and the VVT 36 corresponds to the "variable valve mechanism" according to the fourth aspect of the invention. The ECU 40 executes the processing in the step 114 described above by the "torque variation calculating means" according to the fourth aspect of the invention, and the ECU 40 executes the processing in the step 116 described above by the "IVC advancing means" according to the fourth aspect of the invention.

Further, in the above-described first embodiment, the ECU 40 executes the processing in the step 112 described above by the "torque variation balance controlling means" according to the fifth aspect of the invention.

| Description of Reference Characters | |
|---|---|
| 10 | internal combustion engine |
| 12 | piston |

-continued

| | Description of Reference Characters |
|---|---|
| 14 | cylinder head |
| 16 | combustion chamber |
| 18 | intake passage |
| 20 | exhaust passage |
| 22 | intake valve |
| 24 | exhaust valve |
| 26 | air cleaner |
| 28 | throttle valve |
| 30 | ignition plug |
| 32 | fuel injection valve |
| 34 | in-cylinder pressure sensor |
| 36 | intake valve timing controller (VVT) |
| 40 | ECU (Electronic Control Unit) |
| 42 | crank angle sensor |

The invention claimed is:

1. A control apparatus for an internal combustion engine comprising:
an in-cylinder pressure sensor for outputting an in-cylinder pressure detection value of a predetermined cylinder at a predetermined crank angle in the internal combustion engine;
in-cylinder pressure detecting means for detecting in-cylinder pressure detection values P1 and P2 at predetermined crank angles $\theta_1$ and $\theta_2$ during an adiabatic period of the predetermined cylinder from IVC to ignition timing using the in-cylinder pressure sensor;
absolute pressure correction value calculating means that, when an in-cylinder volume of the predetermined cylinder at the crank angle $\theta_1$ is $V_1$, an in-cylinder volume of the predetermined cylinder at the crank angle $\theta_2$ is $V_2$, and a specific heat ratio of in-cylinder gas in the predetermined cylinder is $\kappa$, calculates a value obtained by dividing a value obtained by subtracting $P_1V_1^\kappa$, which is $PV^\kappa$ at the crank angle $\theta_1$, from $P_2V_2^\kappa$, which is $PV^\kappa$ at the crank angle $\theta_2$, by a value $(V_1^\kappa - V_2^\kappa)$ as an absolute pressure correction value; and
absolute pressure correcting means for correcting the in-cylinder pressure detection value by using the absolute pressure correction value; the apparatus comprising:
comparing means for comparing the adiabatic period with a predetermined period; and
adiabatic period changing means for extending the adiabatic period when the adiabatic period is shorter than the predetermined period.

2. The control apparatus for the internal combustion engine according to claim 1, further comprising:
torque variation calculating means for calculating a torque variation of the internal combustion engine, wherein
the adiabatic period changing means includes ignition delaying means for delaying the ignition timing when the adiabatic period is shorter than the predetermined period and when the torque variation is smaller than a predetermined value.

3. The control apparatus for the internal combustion engine according to claim 2, wherein the ignition delaying means includes delay angle amount setting means for setting a delay angle amount at the ignition timing in a range where the torque variation does not exceed the predetermined value.

4. The control apparatus for the internal combustion engine according to claim 1, further comprising:
torque variation calculating means for calculating the torque variation of the internal combustion engine; and
a variable valve timing mechanism for varying the timing of the IVC, wherein
the adiabatic period changing means includes IVC advancing means for advancing the IVC by controlling the variable valve timing mechanism when the adiabatic period is shorter than the predetermined period and when the torque variation is larger than or equal to a predetermined value.

5. The control apparatus for the internal combustion engine according to claim 2, further comprising:
torque variation balance controlling means that executes torque variation balance control for suppressing the torque variation by controlling the ignition timing of each cylinder in the internal combustion engine when the adiabatic period is shorter than the predetermined period and when the torque variation is larger than or equal to a predetermined value.

6. A control apparatus for an internal combustion engine comprising:
an in-cylinder pressure sensor configured to output an in-cylinder pressure detection value of a predetermined cylinder at a predetermined crank angle in the internal combustion engine;
an in-cylinder pressure detecting device configured to detect in-cylinder pressure detection values P1 and P2 at predetermined crank angles $\theta1$ and $\theta2$ during an adiabatic period of the predetermined cylinder from IVC to ignition timing using the in-cylinder pressure sensor;
an absolute pressure correction value calculating device configured such that, when an in-cylinder volume of the predetermined cylinder at the crank angle $\theta_1$ is $V_1$, an in-cylinder volume of the predetermined cylinder at the crank angle $\theta_2$ is $V_2$, and a specific heat ratio of in-cylinder gas in the predetermined cylinder is $\kappa$, the absolute pressure value calculating device calculates a value obtained by dividing a value obtained by subtracting $P_1V_1^\kappa$, which is $PV^\kappa$ at the crank angle $\theta_1$, from $P_2V_2^\kappa$, which is $PV^\kappa$ at the crank angle $\theta_2$, by a value $(V_1^\kappa - V_2^\kappa)$ as an absolute pressure correction value; and
an absolute pressure correcting device configured to correct the in-cylinder pressure detection value by using the absolute pressure correction value; the apparatus comprising:
a comparing device configured to compare the adiabatic period with a predetermined period; and
an adiabatic period changing device configured to extend the adiabatic period when the adiabatic period is shorter than the predetermined period.

* * * * *